(12) United States Patent
Kojima et al.

(10) Patent No.: US 7,874,145 B2
(45) Date of Patent: Jan. 25, 2011

(54) EMMISION CONTROL DEVICE FOR INTERNAL COMBUSTION ENGINE

(75) Inventors: Mitsutaka Kojima, Okazaki (JP); Kojiro Okada, Nagoya (JP); Kazuma Sanada, Okazaki (JP); Yuji Sato, Okazaki (JP); Hiroshi Tanada, Nagoya (JP); Kouichi Tomida, Nagoya (JP); Keisuke Tashiro, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 812 days.

(21) Appl. No.: 11/896,625

(22) Filed: Sep. 4, 2007

(65) Prior Publication Data

US 2008/0184697 A1 Aug. 7, 2008

(30) Foreign Application Priority Data

Sep. 15, 2006 (JP) .............................. 2006-250977

(51) Int. Cl.
*F01N 3/00* (2006.01)
*F01N 3/10* (2006.01)
*F01N 3/02* (2006.01)

(52) U.S. Cl. .............................. 60/285; 60/286; 60/295; 60/297; 60/299; 60/311

(58) Field of Classification Search .................. 60/284, 60/285, 286, 295, 297, 299, 311
See application file for complete search history.

(56) References Cited

U.S. PATENT DOCUMENTS

| 2003/0159434 A1* | 8/2003 | Ikemoto et al. ................ 60/285 |
| 2007/0180817 A1* | 8/2007 | Yamashita et al. ............ 60/285 |
| 2008/0097680 A1* | 4/2008 | Yoshioka ..................... 701/103 |

FOREIGN PATENT DOCUMENTS

| JP | 62-168945 A | 7/1987 |
| JP | 2001-227383 A | 8/2001 |
| JP | 2003-254129 A | 9/2003 |
| JP | 2003/254130 A | 9/2003 |
| JP | 2004-27995 A | 1/2004 |
| JP | 2006-194118 A | 7/2006 |
| WO | WO-2005/124130 A1 | 12/2005 |
| WO | WO 2006075537 A1 * | 7/2006 |

* cited by examiner

*Primary Examiner*—Thomas E Denion
*Assistant Examiner*—Audrey Klasterka
(74) *Attorney, Agent, or Firm*—Birch, Stewart, Kolasch & Birch, LLP (57) ABSTRACT

Control is performed such that when an HC adsorption catalytic converter having an oxygen storage capacity is in a specified temperature range, fuel supply quantity is increased with a first increase ratio relative to basic fuel quantity based on the operating state of an internal combustion engine, in a first specified period after the end of fuel cut, and increased with a second increase ratio smaller than the first increase ratio, in a second specified period succeeding the first specified period.

18 Claims, 8 Drawing Sheets

EMMISION CONTROL DEVICE FOR INTERNAL COMBUSTION ENGINE

BACKGROUND OF THE INVENTION

1. Field of the Invention

This invention relates to an emission control device for an internal combustion engine, and specifically a technique for improving the efficiency of conversion of HC in an HC adsorption catalytic converter.

2. Description of the Related Art

Generally, in order to convert harmful substances (HC, CO, NOx, etc.) in exhaust to less harmful substances, a catalytic converter such as a three-way catalytic converter is provided in an exhaust passage of an engine (internal combustion engine).

The three-way catalytic converter does not fully exhibit its conversion performance until it reaches the catalyst activation temperature. Even when the three-way catalytic converter is disposed near the engine body for early activation of the catalyst, there remains a problem that HC emitted especially in large quantities in cold start of the engine cannot be converted satisfactorily. In order to solve this problem, an HC adsorption catalytic converter provided with an HC adsorbent effective in HC adsorption has been proposed.

Such HC adsorption catalytic converter has, however, a property that when reaching a fixed temperature (approximately 100° C. to 150° C.), it generally releases the HC adsorbed on the HC adsorbent, and this fixed temperature is lower than the activation temperature of the three-way catalyst (approximately 250° C. to 350° C.). Thus, the HC adsorption catalytic converter has a drawback that even though the three-way catalyst is provided among or downstream of the HC adsorbent, HC desorbed from the HC adsorbent is emitted without being converted before the three-way catalyst reaches the activation temperature.

In this view, there has been developed a device which, when the three-way catalyst has not reached the activation temperature yet, increases oxygen in exhaust by controlling the air-fuel ratio for the engine to be lean or stopping fuel supply to the engine (fuel cut), so as to remove the HC desorbed from the HC adsorbent by oxidation.

Further, particularly in a vehicle provided with an automatic transmission (A/T) connected with an engine by means of a fluid coupling, fuel cut in the cold start of the engine results in a deterioration in vehicle drivability. Thus, there has been developed a device which carries out fuel cut only for some of the cylinders (half of the cylinders, for example) and supplies fuel to the other cylinders (partial fuel cut), thereby removing the HC desorbed from the HC adsorbent by oxidation while preventing a decrease in engine output (see International Patent Publication No. WO2005/124130).

The above-mentioned configuration, in which the air-fuel mixture taken into the engine is controlled to produce exhaust with a lean air-fuel ratio while HC is being desorbed from the HC adsorbent of the HC adsorption catalytic converter, allows the HC desorbed to be removed by reaction with oxygen in the exhaust, but does not fully draw such effect. The same applies to the case in which partial fuel cut is performed.

Meanwhile, recent studies have confirmed that, while oxygen in the exhaust cannot react with the HC desorbed from the HC adsorbent satisfactorily as mentioned above, the oxygen once stored in the HC adsorption catalytic converter by its oxygen storage capacity (OSC) and then released has a high reactivity with the HC desorbed. This is thought to be because the oxygen once stored and then released by the OSC of the HC adsorption catalytic converter is in the form of a radical and therefore higher in reactivity compared with oxygen molecules in the atmosphere, and for this high reactivity, can satisfactorily oxidize the HC desorbed from the HC adsorbent of the HC adsorption catalytic converter.

In this case, however, how to cause the HC adsorption catalytic converter to once store oxygen and then release it is a problem.

In the configuration in which, for early activation, a three-way catalytic converter is disposed near the engine, upstream of the HC adsorption catalytic converter, it is not possible to cause the HC adsorption catalytic converter to release the oxygen stored therein by its OSC until the three-way catalytic converter releases all the oxygen stored therein. Hence, it takes time for the release of the oxygen stored in the HC adsorption catalytic converter to start, which results in low frequency of HC being oxidized satisfactorily.

In the case where the above-mentioned fuel cut is carried out during the deceleration of the vehicle, etc. so as to improve fuel economy, when the engine speed decreases to a certain level, recovery of fuel supply (recovery from fuel cut) is carried out so as to prevent the engine from stalling. Thus, it is conceivable to utilize this such that fuel cut performed while HC is being desorbed causes oxygen to be stored in the HC adsorption catalytic converter by its OSC, and then, recovery from the fuel cut causes the stored oxygen to be released to oxidize HC. This idea has, however, a problem that if, in order to cause the stored oxygen to be released, the exhaust air-fuel ratio is regulated to a highly rich level immediately after the recovery from the fuel cut by controlling the air-fuel mixture taken into the engine and such highly rich exhaust air-fuel ratio is maintained, a rapid increase in engine torque is caused so that vehicle drivability deteriorates after the recovery from the fuel cut. Conversely, if the level of richness of the exhaust air-fuel ratio immediately after the recovery from the fuel cut is not high enough, there are problems that it is difficult to cause the stored oxygen to be released, and that the oxygen remaining in the engine cylinders in large quantities easily produce NOx.

SUMMARY OF THE INVENTION

This invention has been made to solve the problems as mentioned above. The primary object of this invention is to provide an emission control device for an internal combustion engine which can cause the oxygen stored in the HC adsorption catalytic converter by its OSC to be released immediately after recovery from fuel cut, thereby improving the efficiency of oxidation of HC desorbed from the HC adsorbent, and which can keep an increase in engine torque and the production of NOx at a low level when causing the oxygen stored in the HC adsorption catalytic converter to be released.

In order to achieve the above object, the present invention comprises a fuel control means for controlling fuel supply to cylinders of an internal combustion engine, and an HC adsorption catalytic converter provided in an exhaust passage of the internal combustion engine, said HC adsorption catalytic converter being designed to have an oxygen storage capacity for storing oxygen from exhaust when an oxidizing atmosphere is formed and releasing the stored oxygen when a reducing atmosphere is formed, and to adsorb HC from exhaust in a specific low temperature range and desorb the adsorbed HC above said specific low temperature range, wherein the fuel control means includes a fuel cut means for, when fuel-cut conditions are met, performing fuel cut by stopping fuel supply to all or some of the cylinders of the internal combustion engine, and when recovery-from-fuel-cut conditions are met, terminating the fuel cut and recovering fuel supply to the internal combustion engine, and the fuel control means performs control such that when the HC adsorption catalytic converter is within a specified temperature range above said specific low temperature range, fuel supply quantity is increased with a first increase ratio relative to basic fuel quantity based on the operating state of the internal combustion engine, in a first specified period after the end of the fuel cut, and increased with a second increase ratio smaller than the first increase ratio, in a second specified period succeeding the first specified period.

In the present invention, in the first specified period after the recovery from fuel cut, the cylinders are filled with fresh air, and therefore, fuel can be supplied in large quantities corresponding to such large amount of fresh air. In the succeeding second specified period, the oxygen stored in the HC adsorption catalytic converter by its oxygen storage capacity is caused to be released, and the oxygen thus released can oxidize the HC desorbed from the HC adsorbent satisfactorily. In other words, by forming a reducing atmosphere for the HC adsorption catalytic converter early after the recovery from fuel cut, the oxygen stored in the HC adsorption catalytic converter is caused to be released, and the oxygen thus released can improve the efficiency of oxidation of HC desorbed from the HC adsorbent.

A further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Referring to the drawings attached, embodiments of the present invention will be described below.

First, a first embodiment will be described.

Figure 1:
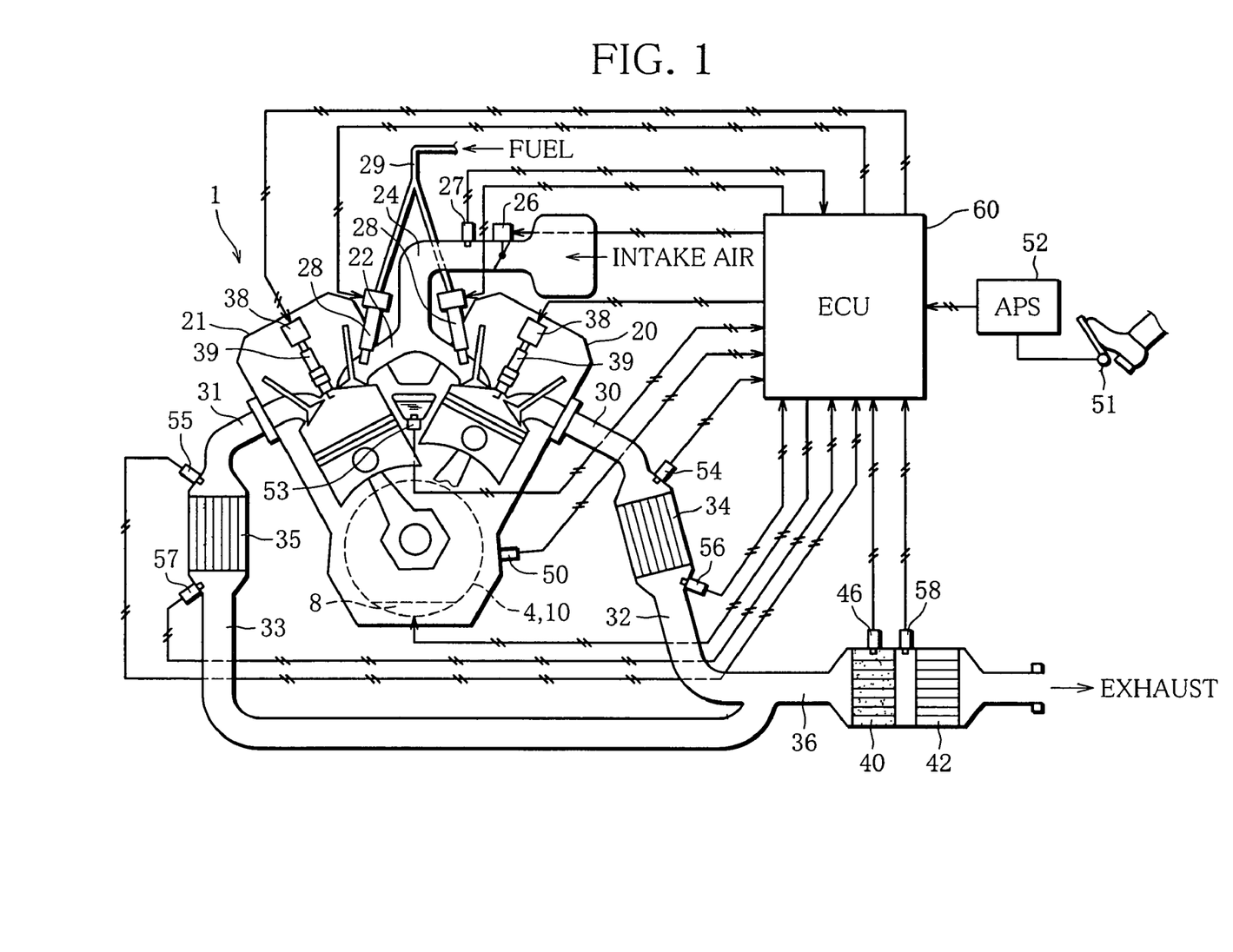
FIG. 1 is a front view showing the schematic configuration of an emission control device for an internal combustion engine according to the present invention, installed on a vehicle.
Figure 2:
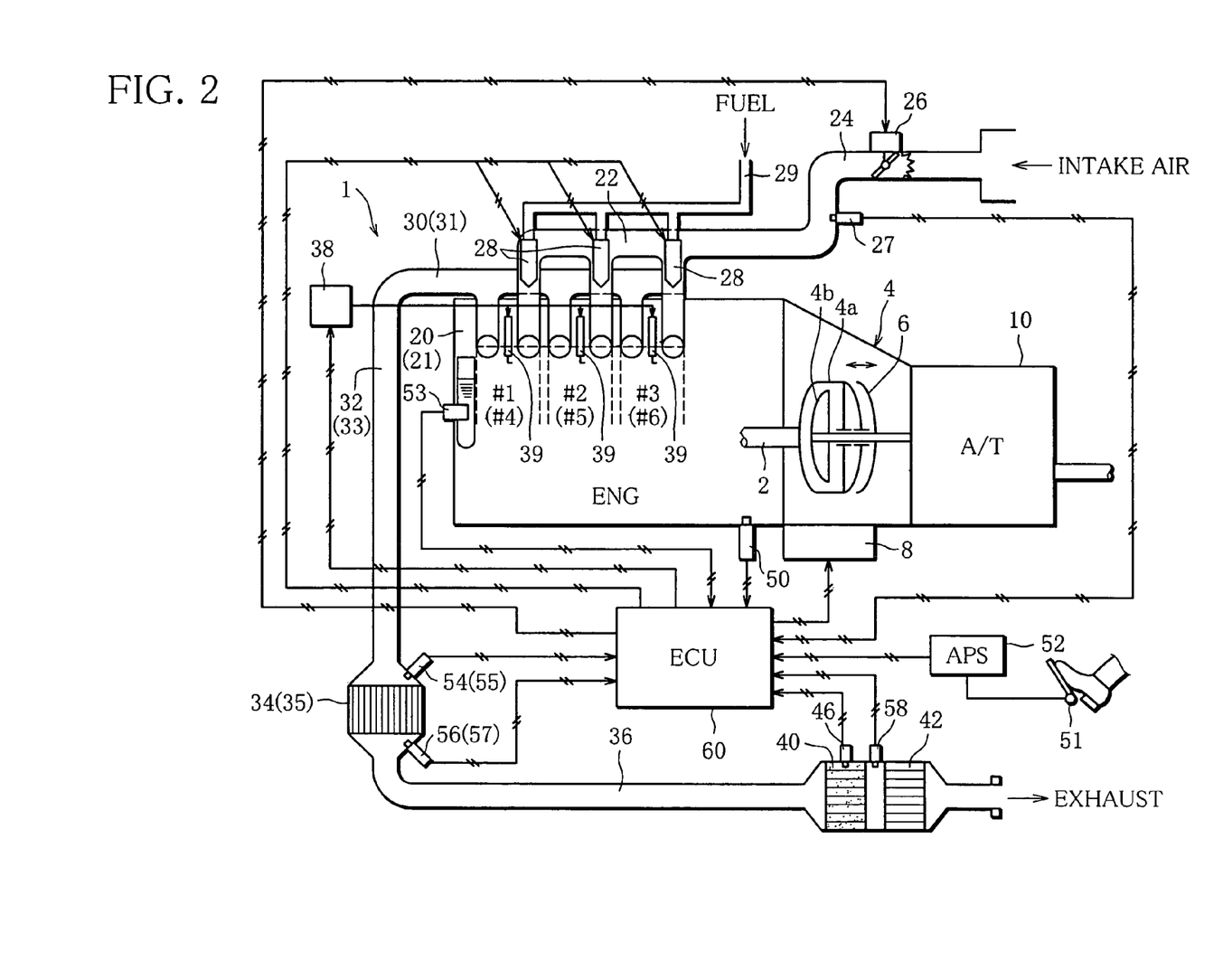
FIG. 2 is a side view showing the schematic configuration of the emission control device for the internal combustion engine according to the present invention, installed on the vehicle.

FIGS. 1 and 2 are front and side views showing the schematic configuration of an emission control device for an internal combustion engine according to the present invention, installed on a vehicle. The configuration of this emission control device will be described below.

As seen in FIG. 2, a driving shaft 2 of an engine body (internal combustion engine, which will be hereinafter referred to simply as an engine) 1 is connected with an automatic transmission (A/T) 10 by means of a fluid coupling 4, and the A/T 10 is connected with a pair of wheels by means of a differential gear unit and an axle, although not shown. A continuously variable transmission (CVT) can be used in place of the A/T 10.

For the engine 1, for example a manifold-injection V-type six-cylinder gasoline engine is adopted. An intake manifold 22 is connected to the cylinder heads 20, 21 for the two banks of the engine 1 such that the branch passages of the intake manifold communicate with the intake ports for the cylinders (#1, #2, #3 and #4, #5, #6), respectively. An intake pipe 24 is connected to the intake manifold 22. To the intake pipe 24, a throttle valve 26 for regulating intake air quantity and an intake pressure sensor 27 for detecting intake pressure are provided.

To each branch passage of the intake manifold 22, an electromagnetic fuel injection valve 28 is provided. Each fuel injection valve 28 is connected to a fuel supply unit (not shown) by a fuel pipe 29, and fuel is supplied through the fuel pipe 29.

Also exhaust manifolds 30, 31 are connected to the cylinder heads 20, 21 such that the branch passages of the exhaust manifolds communicate with the exhaust ports for the cylinders (#1, #2, #3 and #4, #5, #6), respectively. Exhaust pipes 32, 33 are connected to the exhaust manifolds 30, 31, respectively.

To the cylinder heads 20, 21, spark plugs 39 are fitted to face the combustion chambers defined by the cylinders, respectively. Each spark plug 39 is connected to a buttery (not shown) with an ignition coil 38 inserted between.

It is to be noted that to the cylinder heads 20, 21, intake valves for connecting and disconnecting the intake port and the combustion chamber and exhaust valves for connecting and disconnecting the exhaust port and the combustion chamber are fitted together with valve operating mechanisms, of which the description will be omitted.

In the exhaust pipes 32, 33, three-way catalytic converters (upstream catalytic converters) 34, 35 are provided near the engine 1 for early activation. Downstream of the three-way catalytic converters 34, 35, the exhaust pipes 32, 33 are combined into an exhaust pipe 36. In the exhaust pipe 36, an HC trap catalytic converter (HC adsorption catalytic converter) 40 and a three-way catalytic converter 42 are disposed in this order, as viewed along the direction of flow of exhaust.

The three-way catalytic converters 34, 35 comprise, as a catalyst, a precious metal such as platinum (Pt), rhodium (Rh) or the like. Such precious metal has an oxygen storage capacity ($O_2$ storage capacity), i.e., a capacity to store oxygen ($O_2$) when the exhaust air-fuel ratio (exhaust A/F) is lean so that an oxidizing atmosphere is formed, and release the stored oxygen (stored $O_2$) when the exhaust A/F becomes rich so that a reducing atmosphere is formed. Thus, when the catalyst in the three-way catalytic converters 34, 35 is activated at a specific temperature or higher (approximately 250° C. to 350° C.) and, it is possible, by varying the exhaust A/F in a range near the stoichiometric A/F, to cause the three-way catalytic converters 34, 35 to repeat the storing and release of $O_2$, thereby removing HC and CO by oxidation and NOx by reduction, satisfactorily.

The three-way catalytic converter 42 has a similar configuration to the three-way catalytic converters 34, 35.

The three-way catalytic converters 34, 35 can comprise also an oxygen adsorbent such as cerium (Ce), zirconia (Zr) or the like to increase the $O_2$ storage capacity.

The HC trap catalytic converter 40 comprises an HC adsorbent containing, for example zeolite (β type zeolite) as a main constituent. The HC adsorbent has a property that it adsorbs HC from exhaust in a specific low temperature range (temperatures lower than 100° C., for example) and desorbs the adsorbed HC when it rises to a specific temperature or higher (100° C. to 150° C., for example). Thus, the HC trap catalytic converter 40 has a function such that, when the engine 1 is cold so that the amount of HC emitted from the engine 1 is large and the catalyst in the three-way catalytic converters 34, 35 is not activated yet, it adsorbs HC from exhaust, thereby reducing HC emissions into the atmosphere.

Meanwhile, the three-way catalytic converter 42 has, as a primary function, a function of converting the HC desorbed from the HC trap catalytic converter 40.

It is to be noted that the HC trap catalytic converter 40 also comprises a precious metal or an oxygen adsorbent, as used in the three-way catalytic converters 34, 35.

The fluid coupling 4 is publicly known as a torque converter, and comprises a pump 4a, a turbine 4b and a stator not shown. The fluid coupling 4 also comprises a lock-up clutch (direct connection clutch) for locking and unlocking the pump 4a and the turbine 4b, and a hydraulic unit 8 for controlling engagement of the lock-up clutch 6. Thus, the fluid coupling can switch between a direct connected state (locked-up state) and a non-direct connected state (slipping state, unlocked state), depending on the operating state of the vehicle or engine 1.

To the engine 1, also a crank angle sensor 50 for monitoring the rotation of a crank shaft to detecting crank angle is fitted. Engine speed Ne is detected by means of this crank angle sensor 50.

To the engine 1, also an accelerator position sensor (APS) 52 for detecting depression of an accelerator pedal 51 (accelerator opening), and a water temperature sensor 53 for detecting coolant temperature, or engine water temperature for detecting that the engine 1 has been warmed up are fitted.

Further, first $O_2$ sensors 54, 55 are provided upstream of the three-way catalytic converters 34, 35, and second $O_2$ sensors 56, 57 are provided downstream thereof. Further, a temperature sensor 46 is fitted to the HC trap catalytic converter 40, and a third $O_2$ sensor (oxygen concentration detection means) 58 is provided downstream of the HC trap catalytic converter 40.

An electronic control unit (ECU) 60 is a principal control device comprising a central processing unit (CPU), etc. and conducts a variety of controls for the vehicle, including controls over the engine 1. To the input of the ECU 60, a variety of sensors, including the above-mentioned crank angle sensor 50, APS 52, water temperature sensor 53 and first to third $O_2$ sensors 54 to 58, are connected.

To the output of the ECU 60, a variety of devices, including the above-mentioned hydraulic unit 8, throttle valve 26, fuel injection valves 28 and ignition coils 38, are connected. To these output devices, fuel injection quantity, fuel injection timing, ignition timing, etc., which are calculated on the basis of detection information from the sensors, are transmitted. Specifically, appropriate target combustion air-fuel ratio (target A/F) is set on the basis of detection information from the sensors. Normally, the target A/F is feedback-controlled to be a value equal or close to the stoichiometric A/F, on the basis of information from the first $O_2$ sensors 54, 55. Fuel in the amount corresponding to this target A/F (basic fuel quantity) is injected from the fuel injection valve 28 at appropriate timing (fuel control means), the throttle valve 26 is regulated to an appropriate degree of opening, and spark ignition is carried out by the spark plug 39 at appropriate timing (ignition timing control means). Further, the lock-up clutch 6 is engaged or disengaged on the basis of a control instruction from the hydraulic unit 8.

The engine 1 is designed such that so-called fuel cut control, i.e., temporary stop of fuel supply from the injection valves 28 (temporary rest of the cylinders) can be carried out when it is determined that fuel-cut conditions are met, from the information fed to the ECU 60 (fuel cut means).

Specifically, in the engine 1, when the vehicle is decelerating with the engine speed Ne at a specified level or higher and with the accelerated pedal 51 released by the driver, it is determined that the fuel-cut conditions are met, so that fuel cut is carried out appropriately by stopping fuel injection from the fuel injection valves 28, according an instruction from the ECU 60. Further, in the engine 1, when recovery-from-fuel-cut conditions are met, i.e., for example when the engine speed Ne decreases to a recovery speed N1 or lower after the fuel cut, recovery of fuel supply (recovery from fuel cut) is carried out, and immediately after the recovery from fuel cut, in particular, the target A/F is set to be rich to temporarily increase fuel injected from the fuel injection valves 28.

Increasing the fuel injection quantity immediately after the recovery from fuel cut, as mentioned above, allows sufficient engine output to be obtained after the recovery from fuel cut. Further, this reduces the production of NOx by $O_2$ which remains in large quantities in the cylinders due to the introduction of fresh air during the fuel cut, and causes the $O_2$ stored in large quantities by the precious metal of the three-way catalytic converters 34, 35 to be released and reduced by unburned HC in the exhaust, and therefore removed ($O_2$ purge).

As mentioned above, also the HC trap catalytic converter 40 comprises a precious metal or an oxygen absorbent as used in the three-way catalytic converters 34, 35. Hence, if fuel cut is carried out to cause $O_2$ to be stored in the HC trap catalytic converter 40 at the time the HC trap catalytic converter 40 rises to a specific temperature or higher (100° C. to 150° C., for example) so that HC starts being desorbed, and the $O_2$ stored is caused to be released at the time of recovery from the fuel cut, HC adsorbed on the HC trap catalytic converter 40 can be oxidized satisfactorily.

Specifically, $O_2$ once stored in the HC trap catalytic converter 40 by its OSC and then released is in the form of a radical and therefore higher in reactivity as compared with oxygen molecules in the atmosphere and can oxidize the HC desorbed from the HC adsorbent of the HC trap catalytic converter 40, satisfactorily. Consequently, the efficiency of oxidation of HC desorbed from the HC adsorbent of the HC trap catalytic converter 40 improves.

When a reducing atmosphere is formed, i.e., an increased amount of HC (not in the form of a radical) flows into the HC trap catalytic converter 40, it may be concerned that the $O_2$ once stored and then released from the HC trap catalytic converter 40 would react with this HC. However, the HC desorbed from the HC adsorbent of the HC trap catalytic converter 40 is also in the form of a radical, so that the $O_2$ once stored and then released from the HC trap catalytic converter 40 tends to react selectively with the HC desorbed from the HC adsorbent of the HC trap catalytic converter 40.

Thus, in the emission control device for the internal combustion engine as a first embodiment of the present invention, fuel cut and recovery from fuel cut is carried out in accordance with the desorption of HC from the HC trap catalytic converter 40.

Next, the control performed in the emission control device for the internal combustion engine as a first embodiment of the present invention, having the above-described configuration, and the effects thereof will be described in detail.

Figure 3A:
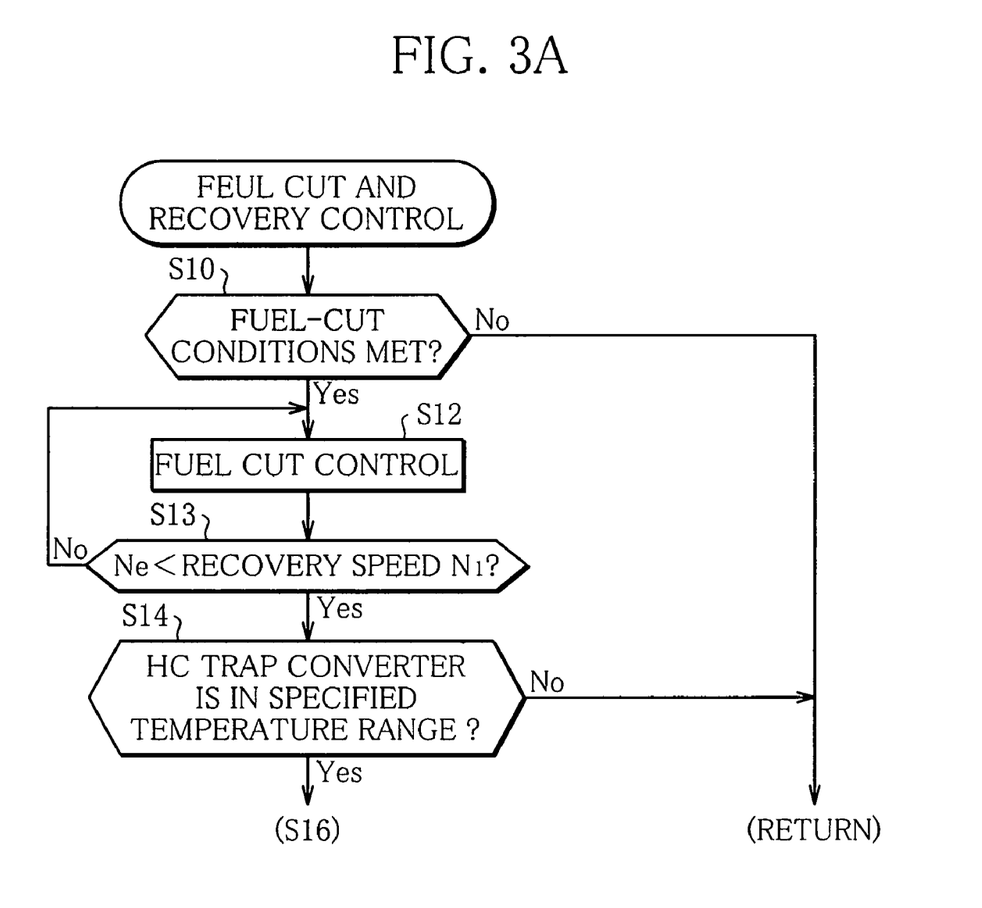
FIG. 3A is a flow chart showing part of a fuel cut and recovery control routine in a first embodiment of the present invention.
Figure 3B:
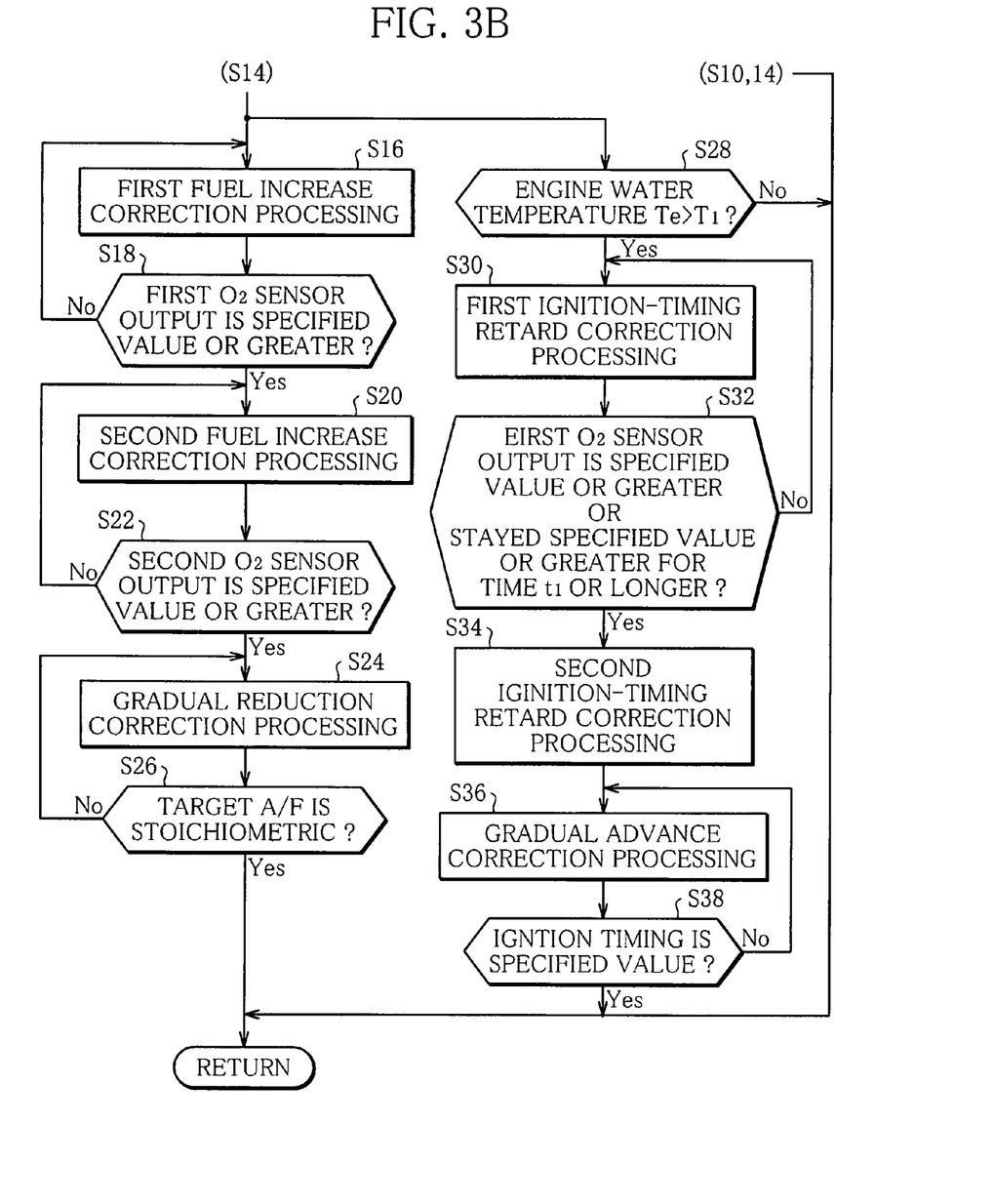
FIG. 3B is a flow chart showing part of a fuel cut and recovery control routine in a first embodiment of the present invention.
Figure 4:
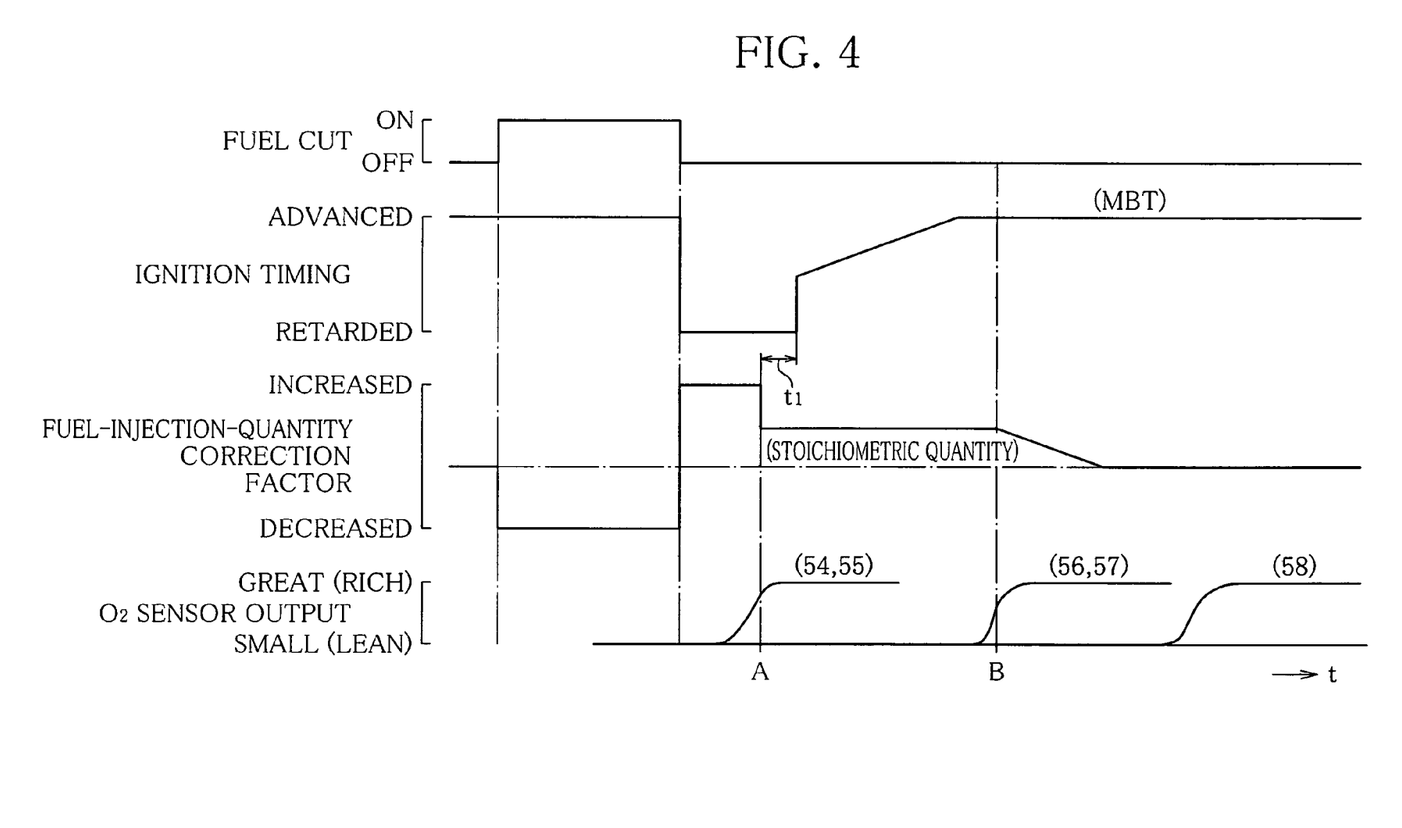
FIG. 4 is a time chart showing the change of fuel cut (on/off), ignition timing, fuel-injection-quantity correction factor, and $O_2$ sensor output, caused by execution of the control routine of FIG. 3.

FIG. 3A is a flow chart showing part of a fuel cut and recovery control routine and FIG. 3B is a flow chart showing part of a fuel cut and recovery control routine in the first embodiment, executed by the ECU 60, and FIG. 4 is a time chart showing the change of fuel cut (on/off), ignition timing, fuel-injection-quantity correction factor, and $O_2$ sensor output, caused by the execution of this control routine. Referring to FIG. 4 and following the flow chart of FIG. 3, the control performed in the emission control device for the internal combustion engine as a first embodiment of the present invention will be described below. It is to be noted that reference signs (54, 55), (56, 57) and (58) in FIG. 4 indicate the first $O_2$ sensors 54, 55, the second $O_2$ sensors 56, 57 and the third $O_2$ sensor 58, respectively.

First, at step S10, whether or not the fuel-cut conditions are met is determined. Specifically, as mentioned above, whether or not the vehicle is decelerating is determined on the basis of information from the APS 52, etc. If the result of the determination is negative (No), i.e., it is determined that the fuel-cut conditions are not met, the succeeding steps of the routine are skipped so that fuel cut control is not performed. If the result of the determination is positive (Yes), i.e., it is determined that the fuel-cut conditions are met since the vehicle is decelerating and does not require engine output so that fuel cut does not cause a problem, step S12 is taken to perform fuel cut control to stop fuel injection from all the fuel injection valves 28.

At step S13, whether or not the engine speed Ne is lower than a recovery speed N1 is determined. If the result of the determination is negative (No), fuel cut control is continued. If the result of the determination is positive (Yes), fuel cut is terminated, determining that the recovery-from-fuel-cut conditions are met, and step S14 is taken.

At step S14, whether or not the HC trap catalytic converter 40 is within a specific temperature range between a specific low temperature Tl and a specific high temperature Th. Specifically, on the basis of information from the temperature sensor 46, whether or not the temperature of the HC trap catalytic converter 40 is higher than the specific low temperature Tl (100° C., for example) at which HC starts being desorbed from the HC trap catalytic converter 40 and lower than the specific high 16. temperature Th (Tl+200° C., for example) at which HC stops being desorbed from the HC trap catalytic converter 40 is determined. If the result of the determination is positive (Yes), i.e., it is determined that the HC trap catalytic converter 40 is within the specific temperature range so that HC is being desorbed from the HC trap catalytic converter 40, steps S16 and S28 are taken to start recovery-from-fuel-cut control.

At step S16, in respect of the fuel injection quantity, first fuel increase correction processing is performed.

Immediately after the recovery from fuel cut, there exists only fresh air in each cylinder. Thus, in the first fuel increase correction processing, primarily in order to reduce the production of NOx by $O_2$ remaining in the cylinders in large quantities, only in the first cycle after the recovery from fuel cut, a particularly increased amount of fuel is injected to each cylinder. Specifically, for example on the basis of intake pressure information from the intake pressure sensor 27, fuel supply quantity is determined such that the fuel supply quantity becomes greater as the intake pressure at the end of fuel cut becomes lower, or in other words, intake air quantity (fresh air quantity) at the end of fuel cut becomes greater (for example, fuel-injection-quantity correction factor 2.0 (first increase ratio)). Here, the target A/F is value 12, for example.

At step S18, whether or not the outputs of the first $O_2$ sensors 54, 55 are a specified value or higher is determined. As mentioned above, basically, the first fuel increase correction processing needs to be performed only in the first cycle after the recovery from fuel cut. Here, however, in order to confirm that the transitional state after the start of fuel injection is over so that the exhaust has an A/F corresponding to the amount of fuel injected, whether or not the exhaust A/F is rich so that the outputs of the first $O_2$ sensors 54, 55 are the specified value or higher is determined (at time A in FIG. 4). If the result of the determination is negative (No), the first fuel increase correction processing is continued, and if the result of the determination is positive (Yes), the first fuel increase correction processing period (first specified period) is terminated, and step S20 is taken.

At step S20, in respect of the fuel injection quantity, second fuel increase correction processing is performed successively.

In the second fuel increase correction processing, in order to maintain the target A/F (value 12, for example) in the first fuel increase correction processing, the fuel supply quantity is determined to be smaller than that in the first fuel increase correction processing (for example, fuel-injection-quantity correction factor 1.3 (second increase ratio)), and fuel injection is performed according to the fuel supply quantity thus determined. This allows the A/F of the exhaust emitted from the engine 1 to be kept rich, satisfactorily, thereby forming a reducing atmosphere for the three-way catalytic converters 34, 35, so that the $O_2$ stored in the three-way catalytic converters 34, 35 is released quickly.

At step S22, whether or not the outputs of the second $O_2$ sensors 56, 57 are a specified value or higher is determined. Specifically, whether or not the release of the $O_2$ stored in the three-way catalytic converters 34, 35 is almost finished and the exhaust A/F downstream of the three-way catalytic converters 34, 35 is rich so that the outputs of the second $O_2$ sensors 56, 57 are the specified value or higher is determined (at time B in FIG. 4). If the result of the determination is negative (No), the second fuel increase correction processing is continued, and if the result of the determination is positive (Yes), the second fuel increase correction processing period (second specified period) is terminated, and step S24 is taken.

At step S24, in respect of the fuel injection quantity, gradual reduction correction processing is performed.

In the gradual reduction correction processing, the fuel injection quantity that has been increased is gradually reduced to the stoichiometric quantity (basic fuel quantity). In other words, the target A/F is brought back to the stoichiometric A/F.

At step S26, whether or not the target A/F has been brought back to the stoichiometric A/F by the gradual reduction correction processing is determined. If the result of the determination is negative (No), the gradual reduction correction processing is continued, and if the result of the determination is positive (Yes), the gradual reduction correction processing is terminated.

Meanwhile, at step S28, on the basis of information from the water temperature sensor 53, whether or not the engine water temperature Te is higher than a specified temperature T1 is determined. If the result of the determination is negative (No), the succeeding steps of the routine are skipped. If the result of the determination is positive (Yes), it can be determined that the ignition timing is allowed be retarded to a relatively great degree since the engine water temperature Te is higher than the specified temperature T1, so that step S30 is taken.

At step S30, in respect of the ignition timing, first ignition-timing retard correction processing is performed.

As mentioned above, in the first fuel increase correction processing, a particularly increased amount of fuel is injected. Thus, in the first ignition-timing retard correction processing, the ignition timing is retarded to a great degree, in accordance with such first fuel increase correction processing (first retarded ignition timing).

At step S32, whether or not the outputs of the first $O_2$ sensors 54, 55 are the specified value or higher or stayed the specified value or higher for a specified time t1 or longer is determined (see FIG. 4). If the result of the determination is negative (No), the first ignition-timing retard correction processing is continued, and if the result of the determination is positive (Yes), step S34 is taken.

At step S34, in respect of the ignition timing, second ignition-timing retard correction processing is performed.

In the second ignition-timing retard correction processing, in accordance with the termination of the first fuel increase correction processing, the first ignition-timing retard correction processing is terminated, and the ignition timing that has been retarded is brought back toward the advance side, to some degree (second retarded ignition timing).

At step S36, in respect of the second retarded ignition timing, gradual advance correction control is performed.

In the gradual advance correction control, the ignition timing retarded is gradually advanced to a specified value (MBT, for example), within the above-mentioned second specified period.

At step S38, whether or not the ignition timing has been brought to the specified value by the gradual advance correction processing is determined. If the result of the determination is negative (No), the gradual advance correction processing is continued, and if the result of the determination is positive (Yes), the gradual advance correction processing is terminated.

As described above, the emission control device as the first embodiment of the present invention comprises an HC trap catalytic converter 40 and three-way catalytic converters 34, 35 disposed upstream of the HC trap catalytic converter 40 in the exhaust passage, wherein, when fuel cut is performed, if the HC trap catalytic converter 40 is within a specific temperature range allowing the release of HC, first fuel increase correction processing is performed from the end of fuel cut until the outputs of first $O_2$ sensors 54, 55 disposed upstream of the three-way catalytic converters 34, 35 become a specified value or higher, so that a particularly increased amount of fuel is injected. After that, until the outputs of second $O_2$ sensors 56, 57 disposed downstream of the three-way catalytic converters 34, 35 become a specified value or higher, second fuel increase correction processing is performed so that fuel is injected in a smaller amount compared with the first fuel increase correction processing. In addition, ignition timing is retarded to a great degree in accordance with the first fuel increase correction processing, and brought back toward the advance side in accordance with the second fuel increase correction processing.

This procedure has the following effects: At the time of recovery from fuel cut, each cylinder is filled with fresh air, and loss of fuel is produced due to evaporation of fuel attached to the cylinder wall. In this view, first, a large amount of fuel is supplied. After that, fuel required to cause the oxygen stored in the three-way catalytic converters 34, 35 to be released is supplied appropriately, without excess or deficit. Consequently, the oxygen stored in the three-way catalytic converters 34, 35 due to fuel cut can be released and consumed early, while preventing a rapid increase in engine torque and reducing the production of NOx.

Such early release and consumption of oxygen from the three-way catalytic converters 34, 35 results in early formation of a reducing atmosphere for the HC trap catalytic converter 40, thereby enabling early release of oxygen that has been stored in the HC trap catalytic converter 40 by its OSC.

The $O_2$ once stored in the HC trap catalytic converter 40 by its OSC and then released is in the form of a radical and therefore higher in reactivity as compared with oxygen molecules in the atmosphere. Thus, such oxygen can oxidize the HC desorbed from the HC adsorbent of the HC trap catalytic converter 40, satisfactorily. Consequently, the efficiency of oxidation of the HC desorbed from the HC adsorbent of the HC trap catalytic converter 40 improves.

In this procedure, the fuel supply quantity in the first fuel increase correction processing is determined such that the fuel supply quantity becomes greater as the intake pressure at the end of fuel cut becomes lower, or in other words, the fresh air quantity at the end of fuel cut becomes greater. This results in more appropriate control of fuel supply quantity, and therefore more effective release of $O_2$ stored in the three-way catalytic converters 34, 35.

Further, after the second fuel increase correction processing, gradual reduction correction processing is performed to gradually bring the fuel injection quantity back to the stoichiometric quantity. This can prevent excessive supply of the reducing agent for causing the release of oxygen stored in the HC trap catalytic converter 40, and prevent a rapid decrease in engine torque. Further, since the gradual advance correction processing is performed in accordance with the reduction of the fuel injection quantity to gradually advance the ignition timing to a specified value (MBT, for example), misfire can be prevented.

Further, the second fuel increase correction processing is terminated when the outputs of the second $O_2$ sensors 56, 57 disposed downstream of the three-way catalytic converters 34, 35 become a specified value or higher (at time B in FIG. 4). This enables the increase of the fuel supply quantity to be terminated appropriately, when the release of the $O_2$ stored in the three-way catalytic converters 34, 35 is almost finished.

In the above-described first embodiment, fuel cut is continued from the time that the fuel-cut conditions are met until the recovery-from-fuel-cut conditions are met, so that the HC trap catalytic converter 40 continues storing oxygen. The amount of oxygen that the HC trap catalytic converter 40 can store is, however, determined by the amount of the oxygen adsorbent or precious metal having the OSC. Thus, the continuation of fuel cut, and therefore of oxygen supply can produce excess oxygen, namely oxygen not stored. Such excess oxygen cannot be utilized effectively in the reaction of oxygen radical, which is released from the HC trap catalytic converter 40 and shows high oxidation efficiency, with desorbed HC, taking place on the HC trap catalytic converter 40 at the time of recovery from fuel cut.

In this view, it is desirable to determine whether to continue, stop or resume the fuel cut, on the basis of the output of the third $O_2$ sensor 58, for example.

Specifically, if, during fuel cut, the third $O_2$ sensor 58 gives an output corresponding to a lean air-fuel ratio, this indicates that the oxygen stored in the three-way catalytic converter 34, 35 and in the HC trap catalytic converter 40 by its OSC has reached a saturation level, and that the oxidation ratio on the HC trap catalytic converter 40 is low. Even if fuel cut is further continued so that supply of oxygen to the HC trap catalytic converter 40 is continued, high oxidation ratio cannot be expected. Thus, fuel cut is once stopped, thereby causing the oxygen stored in the three-way catalytic converters 34, 35 to be released and consumed, and then causing the oxygen stored in the HC trap catalytic converter 40 by its OSC to be released in the form of a radical. This results in a further improvement in oxidation ratio for the HC desorbed from the HC adsorbent of the HC trap catalytic converter 40.

Then, when the third $O_2$ sensor 52 detects a specified value or higher (value corresponding to the stoichiometric A/F, for example), this indicates that $O_2$ has been released from the HC trap catalytic converter 40. Thus, fuel cut is resumed. Consequently, the HC trap catalytic converter 40 can store $O_2$ efficiently.

Next, a modified form of the first embodiment will be described.

Figure 5:
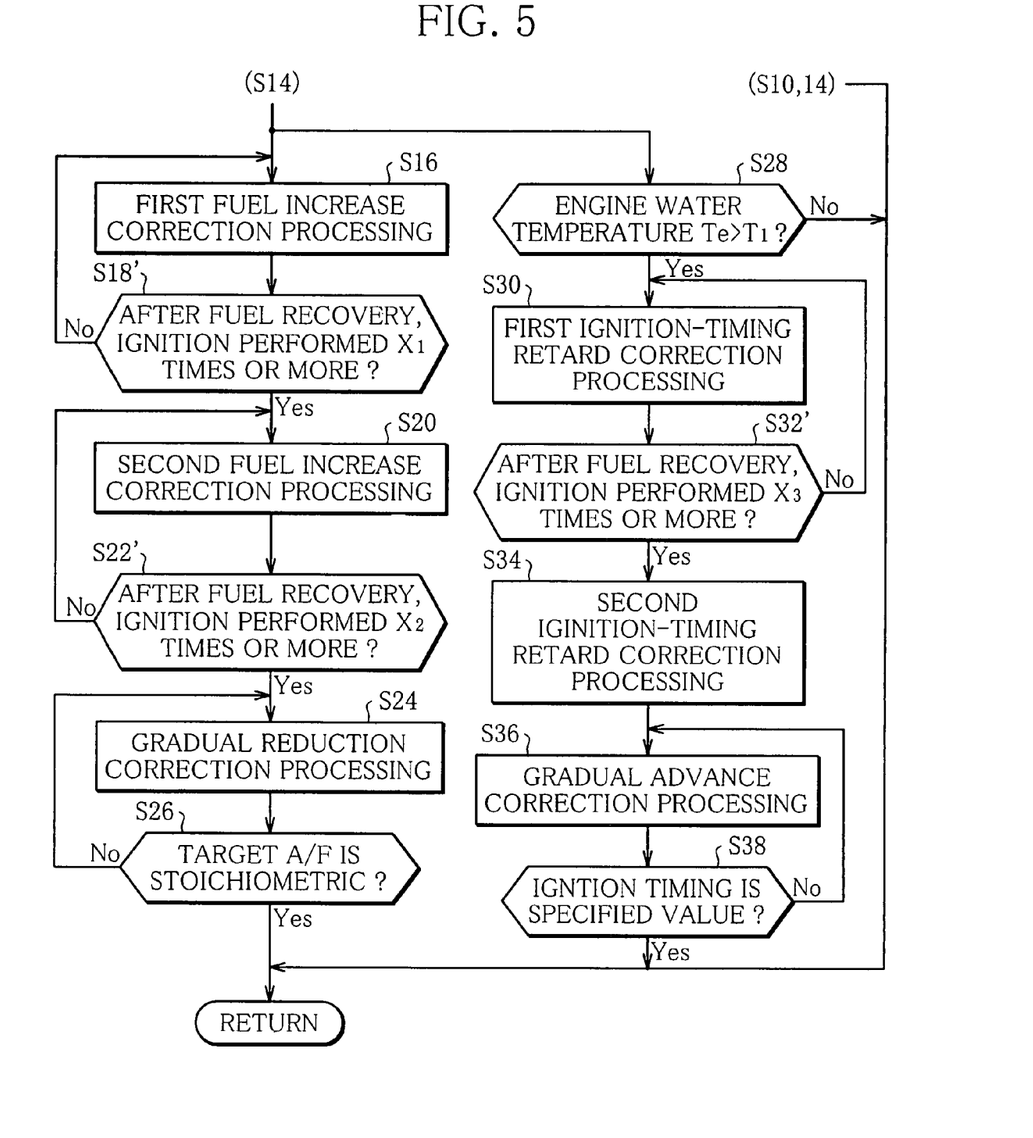
FIG. 5 is a flow chart showing part of a fuel cut and recovery control routine in a modified form of the first embodiment of the present invention.

The modified form of the first embodiment differs from the first embodiment only in part of the fuel cut and recovery control routine. FIG. 5 is a flow chart showing part of the fuel cut and recovery control routine in the modified form of the first embodiment. Following this flow chart, chiefly the differences from the first embodiment will be described below.

In the modified form of the first embodiment, after steps S10 to S14 are performed and then the first fuel increase correction processing is performed at step S16, step S18' is taken, i.e., whether or not the number of times that ignition has been performed by means of the spark plug 39 after recovery from fuel cut is a specified number X1 or greater is determined. Thus, whether to terminate the first fuel increase correction processing or not is determined by the number of engine operating cycles performed after recovery from fuel cut. If the result of the determination is negative (No), the first fuel increase correction processing is continued, and if the result of the determination is positive (Yes), step S20 is taken.

After the second fuel increase correction processing is performed at step S20, step S22' is taken, i.e., whether or not the number of times that ignition has been performed by means of the spark plug 39 after recovery from fuel cut is a specified number X2(>X1) or greater is determined. Thus, whether to terminate the second fuel increase correction processing or not is also determined by the number of engine operating cycles performed after recovery from fuel cut. If the result of the determination is negative (No), the second fuel increase correction processing is continued, and if the result of the determination is positive (Yes), step S24 is taken to perform the gradual reduction correction processing. Then at step S26, whether or not the target A/F has been brought to the stoichiometric A/F is determined. If the result of the determination is negative (No), the gradual reduction correction processing is continued, and if the result of the determination is positive (Yes), the gradual reduction correction processing is terminated.

Meanwhile, at step S28, whether or not the engine water temperature Te is higher than a specified temperature Tl is determined, and if the result of the determination is positive (Yes), step S30 is taken.

After the first ignition-timing retard correction processing is performed at Step S30, Step S32' is taken, i.e., whether or not the number of times that ignition has been performed by means of the spark plug 39 after recovery from fuel cut is a specified number X3(X2>X3>X1) or greater is determined. Thus, whether to terminate the first ignition-timing retard correction processing or not is also determined by the number of engine operating cycles performed after recovery from fuel cut. If the result of the determination is negative (No), the first ignition-timing retard correction processing is continued, and if the result of the determination is positive (Yes), step S34 is taken to perform the second ignition-timing retard correction processing. Then at step S36, the gradual advance correction processing is performed, and then at step S38, whether or not the ignition timing has been brought to the specified value is determined. If the result of the determination is positive (Yes), the gradual advance correction processing is terminated.

This modified form of the first embodiment has the same function and effects as the first embodiment. Specifically, since the $O_2$ stored in the three-way catalytic converters 34, 35 is caused to be released and consumed early after recovery from fuel cut, while preventing a rapid increase in engine torque and reducing the production of NOx, a reducing atmosphere can be formed for the HC trap catalytic converter 40 early, so that the oxygen stored in the HC trap catalytic converter 40 by its OSC can be caused to be release early. Consequently, the efficiency of oxidation of the HC desorbed from the HC adsorbent of the HC trap catalytic converter 40 improves.

Next, a second embodiment will be described.

The second embodiment differs from the first embodiment in that fuel cut is performed only for some of the cylinders (partial fuel cut), while in the first embodiment, fuel cut is performed for all the cylinders.

Figure 6A:
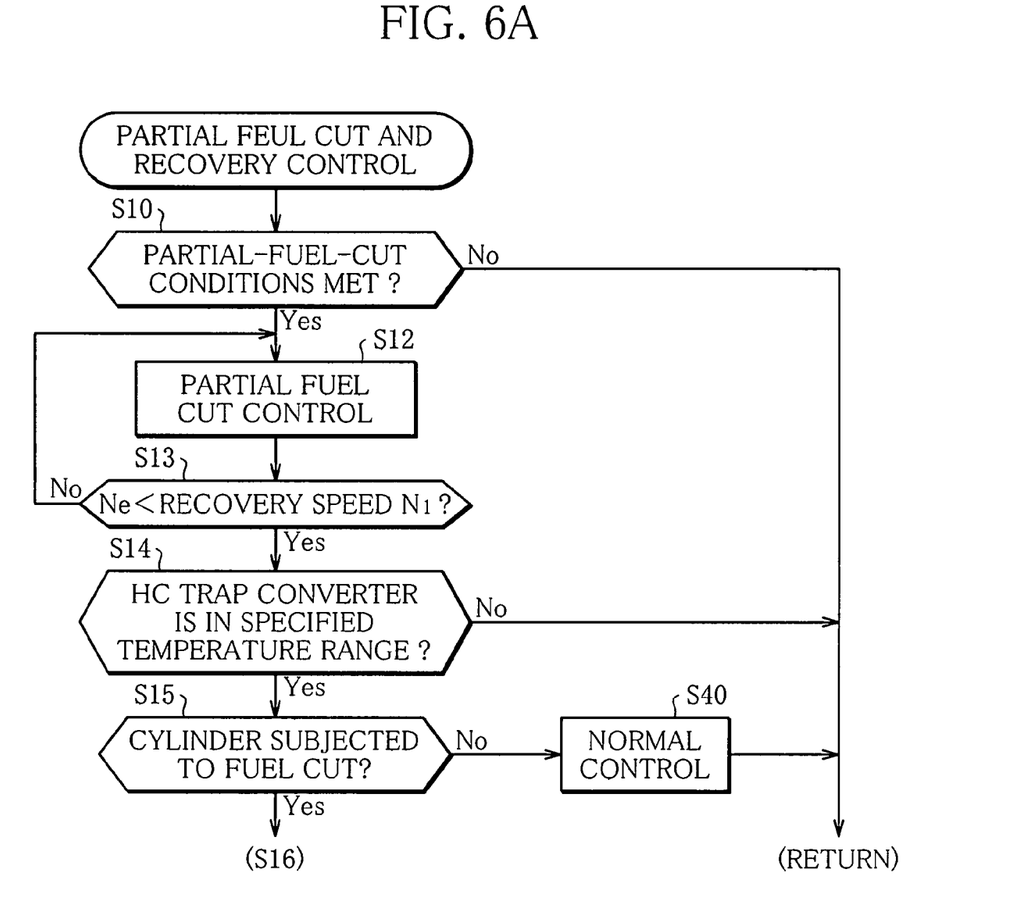
FIG. 6A is a flow chart showing part of a partial fuel cut and recovery control routine in a second embodiment of the present invention.
Figure 6B:
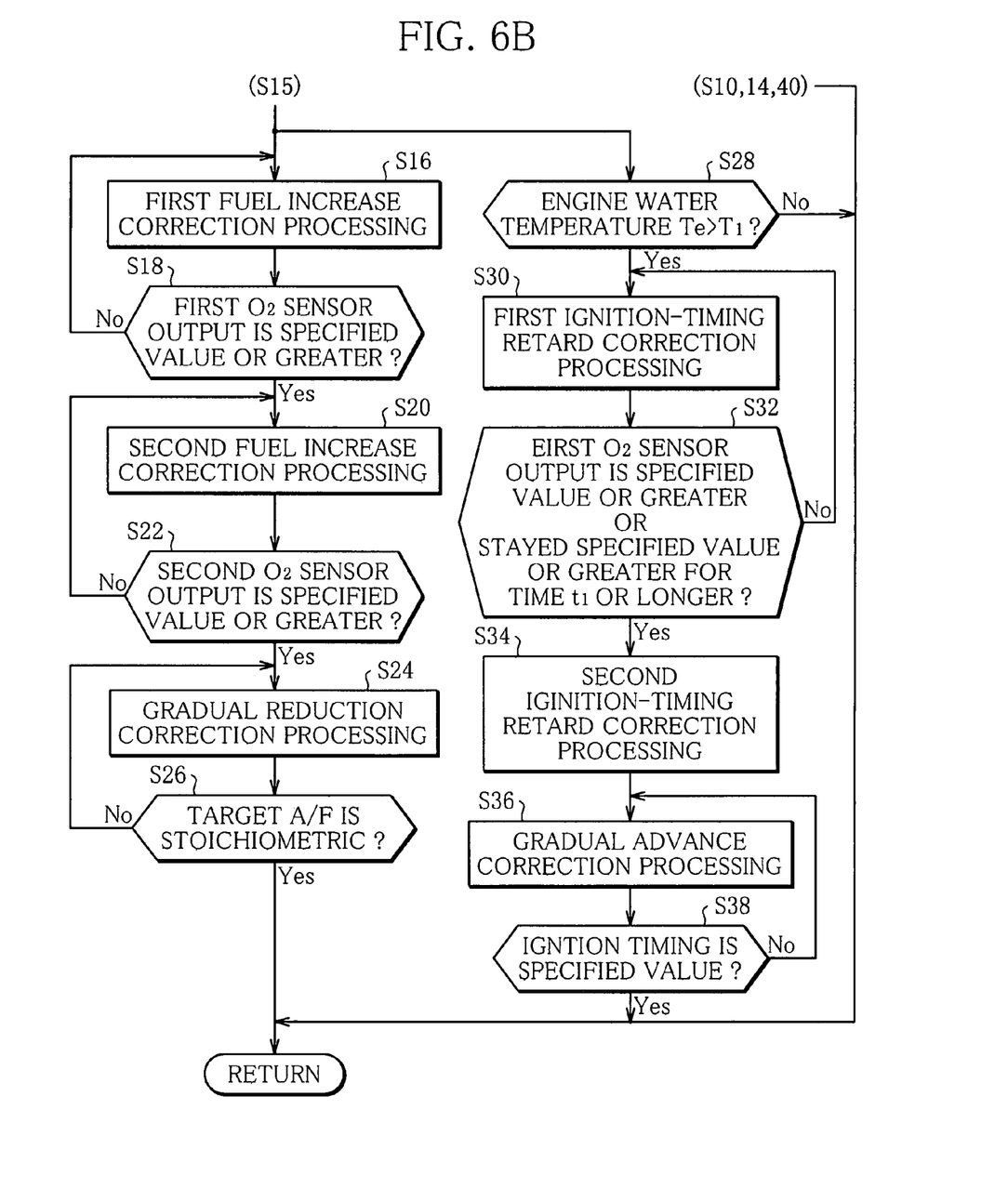
FIG. 6B is a flow chart showing part of a partial fuel cut and recovery control routine in a second embodiment of the present invention.

FIG. 6A is a flow chart showing part of a partial fuel cut and recovery control routine and FIG. 6B is a flow chart showing part of a fuel cut and recovery control routine in the second embodiment. Following this flow chart, chiefly the differences from the first embodiment will be described below.

First, at step S10, whether or not partial-fuel-cut conditions are met is determined. Specifically, whether or not the vehicle is decelerating is determined on the basis of information from the APS 52, etc. as in the first embodiment, and further, whether or not the lock-up clutch 6 is in the OFF state, i.e., unengaged is determined.

When the engine 1 is cold, normally the A/T 10 is also cold, and hence, the automatic transmission fluid (ATF) is at low temperature. In such situation, the lock-up clutch 6 engaged results in unstable transmission control. Hence, normally, when the automatic transmission fluid is at specified low temperatures (lower than 25° C., for example), the lock-up clutch 6 is unengaged. If, however, fuel cut is performed for all the cylinders with the lock-up clutch 6 unengaged, this can cause the engine 1 to stall. Thus, partial fuel cut is performed, i.e., some of the cylinders are subjected to fuel cut while the other cylinders receive fuel supply. Thus, in this embodiment, the lock-up clutch 6 being unengaged constitutes the partial-fuel-cut conditions.

If the result of the determination at step S10 is negative (No), i.e., it is determines that the partial-fuel-cut conditions are not met, the succeeding steps of the routine are skipped and partial fuel cut control is not performed. If the result of the determination is positive (Yes), i.e., it is determined that the partial-fuel-conditions are met since the vehicle is decelerating so that engine output is not required and since the lock-up clutch 6 is unengaged so that the partial fuel cut is desirable, step S12 is taken to perform partial fuel cut control. Specifically, fuel cut is performed for the cylinders (#1, #2, #3, for example) in one of the banks (first bank) of the engine 1, while normal control is performed for the cylinders (#4, #5, #6, for example) in the other bank (second bank) on the basis of the fuel quantity corresponding to the target A/F (basic fuel quantity).

At step S13, whether or not the engine speed Ne is lower than a recovery speed N1 is determined. If the result of the determination is negative (No), the partial fuel cut is continued, and if the result of the determination is positive (Yes), the partial fuel cut is terminated and step S14 is taken.

At step S14, whether or not the HC trap catalytic converter 40 is within a specific temperature range between a specific low temperature Tl and a specific high temperature Th is determined. If the result of the determination is positive (Yes), i.e., it is determined that the HC trap catalytic converter 40 is within the specific temperature range so that HC is being desorbed from the HC trap catalytic converter 40, step S15 is taken.

At step S15, the cylinders subjected to fuel cut in the partial fuel cut, i.e., the cylinders in the first bank (#1, #2, #3, for example) are identified. Then, for the cylinders other than those subjected to fuel cut, i.e., the cylinders in the second bank (#4, #5, #6, for example), normal control is continued at step S40. Meanwhile, for the cylinders subjected to fuel cut, i.e., the cylinders in the first bank (#1, #2, #3, for example), recovery-from-fuel-cut control is started at steps S16 and S28.

In the succeeding steps, the recovery-from-fuel-cut control is performed in the same manner as the first embodiment (steps S16 to S38 in FIG. 3B).

As a modified form of the second embodiment, the recovery-from-fuel-cut control can be performed in the same manner as the modified from of the first embodiment (steps S16 to S38 in FIG. 5).

As in the first embodiment, also in the partial fuel cut in the second embodiment, the $O_2$ stored in the three-way catalytic converter 34 corresponding to the bank comprising the cylinders subjected to fuel cut is caused to be released early after recovery from fuel cut, while preventing a rapid increase in engine torque and reducing the production of NOx. Thus, a reducing atmosphere can be formed early for the HC trap catalytic converter 40, so that the oxygen stored in the HC trap catalytic converter 40 by its OSC can be caused to be released early. Consequently, the efficiency of oxidation of the HC desorbed from the HC adsorbent of the HC trap catalytic converter 40 improves.

Further, in the second embodiment, for the cylinders not subjected to fuel cut, normal control is maintained so that recovery-from-fuel-cut control is not performed. By obviating needless partial fuel cut and needless recovery-from-fuel-cut control in this manner, deterioration in fuel economy can be prevented.

Incidentally, fuel cut may be performed for the cylinders in the second bank (#4, #5, #6, for example) in place of those in the first bank.

Further, also the second embodiment can include a third $O_2$ sensor 58 disposed downstream of the HC trap catalytic converter 40 as shown in FIG. 2 so that whether to continue, stop or resume the partial fuel cut is determined on the basis of the output of the third $O_2$ sensor 58.

In the above, embodiments of the emission control device for the internal combustion engine according to present invention have been described. The present invention is, however, not limited to the described embodiments.

For example, although in the described embodiments, the engine 1 is a manifold-injection V-type six-cylinder gasoline engine, the engine 1 is not limited to this but any type that allows fuel cut. For example, the engine 1 can be a direct-ignition gasoline engine or the like.

Further, in the described embodiments, the engine 1 is a V-type engine and three-way catalytic converters 34, 35 are provided corresponding to the respective banks. The configuration is however not limited to this. The configuration including only the HC trap catalytic converter 40 without such three-way catalytic converters, or the configuration including only one three-way catalytic converter, upstream of the HC trap catalytic converter 40, are also possible.

Further, in place of the third $O_2$ sensor 58 in the described embodiments, another type of sensor capable of detecting oxygen concentration, such as a linear A/F sensor (UEGO), can be used.

What is claimed is:

1. An emission control device for an internal combustion engine, comprising:
   a fuel control means for controlling fuel supply to cylinders of the internal combustion engine, and
   an HC adsorption catalytic converter provided in an exhaust passage of the internal combustion engine, said HC adsorption catalytic converter being designed to have an oxygen storage capacity for storing oxygen from exhaust when an oxidizing atmosphere is formed and releasing the stored oxygen when a reducing atmosphere is formed, and to adsorb HC from exhaust in a specific low temperature range and desorb the adsorbed HC above said specific low temperature range, wherein
   the fuel control means includes a fuel cut means for, when fuel-cut conditions are met, performing fuel cut by stopping fuel supply to all the cylinders of the internal combustion engine, and when recovery-from-fuel-cut conditions are met, terminating the fuel cut and recovering fuel supply to the internal combustion engine, and the fuel control means performs control such that when the HC adsorption catalytic converter is within a specified temperature range above said specific low temperature range, fuel supply quantity is increased with a first increase ratio relative to basic fuel quantity based on the operating state of the internal combustion engine, in a first specified period after the end of the fuel cut, and increased with a second increase ratio smaller than the first increase ratio, in a second specified period succeeding the first specified period.

2. The emission control device for the internal combustion engine according to claim 1, wherein
   the first increase ratio is determined such that the first increase ratio becomes greater as pressure in an intake pipe at the end of the fuel cut becomes lower.

3. The emission control device for the internal combustion engine according to claim 1, wherein
   the fuel control means performs control such that, after the second specified period, the fuel supply quantity for the cylinders is gradually reduced to the basic fuel quantity.

4. The emission control device for the internal combustion engine according to claim 1, further comprising an oxygen concentration detection means disposed downstream of the HC adsorption catalytic converter, wherein when the fuel-cut conditions are met, the fuel control means stops the fuel cut when the oxygen concentration detected by the oxygen concentration detection means increases to above a specified concentration, and resumes the fuel cut when the oxygen concentration decreases to below the specified concentration.

5. The emission control device for the internal combustion engine according to claim 1, further comprising an ignition timing control means for controlling ignition timing for the cylinders of the internal combustion engine, wherein
the ignition timing control means controls the ignition timing such that in said first specified period, ignition is carried out at first retarded ignition timing which is retarded relative to standard ignition timing based on the operating state of the internal combustion engine, and in said second specified period, ignition is performed at second retarded ignition timing which is retarded relative to the standard ignition timing and advanced relative to the first ignition timing.

6. The emission control device for the internal combustion engine according to claim 5, wherein
the ignition timing control means performs control such that the second retarded ignition timing is gradually advanced to the standard ignition timing.

7. An emission control device for an internal combustion engine, comprising:
a fuel control means for controlling fuel supply to cylinders of the internal combustion engine, and
an HC adsorption catalytic converter provided in an exhaust passage of the internal combustion engine, said HC adsorption catalytic converter being designed to have an oxygen storage capacity for storing oxygen from exhaust when an oxidizing atmosphere is formed and releasing the stored oxygen when a reducing atmosphere is formed, and to adsorb HC from exhaust in a specific low temperature range and desorb the adsorbed HC above said specific low temperature range, wherein
the fuel control means includes a fuel cut means for, when fuel-cut conditions are met, performing fuel cut by stopping fuel supply to at least one specified cylinder among the cylinders of the internal combustion engine, and when recovery-from-fuel-cut conditions are met, terminating the fuel cut and recovering fuel supply to the internal combustion engine, and the fuel control means performs control such that when the HC adsorption catalytic converter is within a specified temperature range above said specific low temperature range, fuel supply quantity for said at least one specified cylinder is increased with a first increase ratio relative to basic fuel quantity based on the operating state of the internal combustion engine, in a first specified period after the end of the fuel cut, and increased with a second increase ratio smaller than the first increase ratio, in a second specified period succeeding the first specified period.

8. The emission control device for the internal combustion engine according to claim 7, wherein
the first increase ratio is determined such that the first increase ratio becomes greater as pressure in an intake pipe at the end of the fuel cut becomes lower.

9. The emission control device for the internal combustion engine according to claim 7, wherein
the fuel control means performs control such that, after the second specified period, the fuel supply quantity for said at least one specified cylinder is gradually reduced to the basic fuel quantity.

10. The emission control device for the internal combustion engine according to claim 7, further comprising an oxygen concentration detection means disposed downstream of the HC adsorption catalytic converter, wherein
when the fuel-cut conditions are met, the fuel control means stops the fuel cut when the oxygen concentration detected by the oxygen concentration detection means increases to above a specified concentration, and resumes the fuel cut when the oxygen concentration decreases to below the specified concentration.

11. The emission control device for the internal combustion engine according to claim 7, further comprising an ignition timing control means for controlling ignition timing for the cylinders of the internal combustion engine, wherein
the ignition timing control means controls the ignition timing for said at least one specified cylinder such that in said first specified period, ignition is carried out at first retarded ignition timing which is retarded relative to standard ignition timing based on the operating state of the internal combustion engine, and in said second specified period, ignition is performed at second retarded ignition timing which is retarded relative to the standard ignition timing and advanced relative to the first ignition timing.

12. The emission control device for the internal combustion engine according to claim 11, wherein
the ignition timing control means performs control such that the second retarded ignition timing is gradually advanced to the standard ignition timing.

13. The emission control device for the internal combustion engine according to claim 7, wherein
when fuel cut is performed by the fuel cut means stopping fuel supply to said at least one specified cylinder, the fuel control means supplies fuel to the other cylinders on the basis of the basic fuel quantity after the end of the fuel cut.

14. The emission control device for the internal combustion engine according to claim 13, wherein
the first increase ratio is determined such that the first increase ratio becomes greater as pressure in an intake pipe at the end of the fuel cut becomes lower.

15. The emission control device for the internal combustion engine according to claim 13, wherein
the fuel control means performs control such that, after the second specified period, the fuel supply quantity to said at least one specified cylinder is gradually reduced to the basic supply quantity.

16. The emission control device for the internal combustion engine according to claim 13, further comprising an oxygen concentration detection means disposed downstream of the HC adsorption catalytic converter, wherein
when the fuel-cut conditions are met, the fuel control means stops the fuel cut when the oxygen concentration detected by the oxygen concentration detection means increases to above a specified concentration, and resumes the fuel cut when the oxygen concentration decreases to below the specified concentration.

17. The emission control device for the internal combustion engine according to claim 13, further comprising an ignition timing control means for controlling ignition timing for the cylinders of the internal combustion engine, wherein
the ignition timing control means controls the ignition timing for said at least one specified cylinder such that in said first specified period, ignition is carried out at first retarded ignition timing which is retarded relative to standard ignition timing based on the operating state of the internal combustion engine, and in said second specified period, ignition is performed at second retarded ignition timing which is retarded relative to the standard ignition timing and advanced relative to the first ignition timing.

18. The emission control device for the internal combustion engine according to claim 17, wherein the ignition timing control means performs control such that the second retarded ignition timing is gradually advanced to the standard ignition timing.

* * * * *